United States Patent
Welton et al.

(10) Patent No.: US 10,599,314 B2
(45) Date of Patent: *Mar. 24, 2020

(54) IDENTIFYING AND SURFACING RELEVANT REPORT ARTIFACTS IN DOCUMENTS

(71) Applicant: Microsoft Technology Licensing, LLC, Redmond, WA (US)

(72) Inventors: Nickolas Welton, Seattle, WA (US); Benjamin E. Rampson, Woodinville, WA (US); Stephen J. Adelson, Bellevue, WA (US); L. Stephen Lobo, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 158 days.

This patent is subject to a terminal disclaimer.

(21) Appl. No.: 15/689,600

(22) Filed: Aug. 29, 2017

(65) Prior Publication Data

US 2017/0357428 A1  Dec. 14, 2017

Related U.S. Application Data

(63) Continuation of application No. 14/335,864, filed on Jul. 18, 2014, now Pat. No. 9,778,833.

(51) Int. Cl.
*G06F 3/048* (2013.01)
*G06F 3/0484* (2013.01)
*H04L 29/06* (2006.01)
*G06Q 10/10* (2012.01)

(52) U.S. Cl.
CPC ...... *G06F 3/04847* (2013.01); *G06F 3/04842* (2013.01); *G06Q 10/10* (2013.01); *H04L 65/403* (2013.01)

(58) Field of Classification Search
CPC .......... G06F 3/00; G06F 3/048; G06F 3/0481; G06F 3/0484; G06F 3/04842; G06F 3/04847; G06F 9/4443; G06F 17/00; G06F 17/30; H04L 29/08
See application file for complete search history.

(56) References Cited

U.S. PATENT DOCUMENTS

| | | |
|---|---|---|
| 5,157,783 A | 10/1992 | Anderson et al. |
| RE39,326 E | 10/2006 | Comer et al. |
| 7,636,709 B1 | 12/2009 | Srikant et al. |
| 8,204,895 B2 | 6/2012 | Polo-Malouvier et al. |
| 8,577,847 B2 | 11/2013 | Blazejewski et al. |
| 8,631,034 B1 | 1/2014 | Peloski |

(Continued)

OTHER PUBLICATIONS

"Types of SSRS Reports", Retrieved From <<http://sql-bi-dev.blogspot.in/2010/07/types-of-ssrs-reports.html>>, Jul. 2, 2010, 3 Pages.

(Continued)

*Primary Examiner* — Xiomara L Bautista

(57) ABSTRACT

Disclosed herein are systems, methods, and software for enhancing document productivity. In at least one implementation, an attempt to add a data connection in a document is identified. In response to identifying the attempt to add the data connection in the document, at least one other document is identified as relevant to the attempt. A suggestion may be surfaced in a user interface that identifies at least a portion of the one other documents.

20 Claims, 7 Drawing Sheets

(56) References Cited

U.S. PATENT DOCUMENTS

| | | |
|---|---|---|
| 9,213,472 B2* | 12/2015 | Sorin ............... G06F 3/04886 |
| 2007/0055922 A1 | 3/2007 | Martynov et al. |
| 2011/0153611 A1 | 6/2011 | Ankisettipalli et al. |
| 2012/0246260 A1 | 9/2012 | Kama |
| 2013/0086460 A1 | 4/2013 | Folting et al. |
| 2013/0124960 A1 | 5/2013 | Velingkar et al. |
| 2013/0139081 A1 | 5/2013 | Alon et al. |
| 2014/0032567 A1 | 1/2014 | Assadollahi et al. |
| 2014/0082550 A1 | 3/2014 | Farmer |
| 2014/0236994 A1 | 8/2014 | Aikawa et al. |

OTHER PUBLICATIONS

"Non Final Office Action Issued in U.S. Appl. No. 14/335,864", dated Feb. 10, 2017, 9 Pages.

"Notice of Allowance Issued in U.S. Appl. No. 14/335,864", dated May 31, 2017, 5 Pages.

"International Preliminary Report on Patentability Issued in PCT Application No. PCT/US2015/040669", dated Sep. 16, 2016, 07 Pages.

"International Search Report & Written Opinion Received for PCT Application No. PCT/US2015/040669", dated Oct. 9, 2015, 9 Pages.

"Second Written Opinion Issued in PCT Application No. PCT/US2015/040669", dated May 24, 2016, 6 Pages.

\* cited by examiner

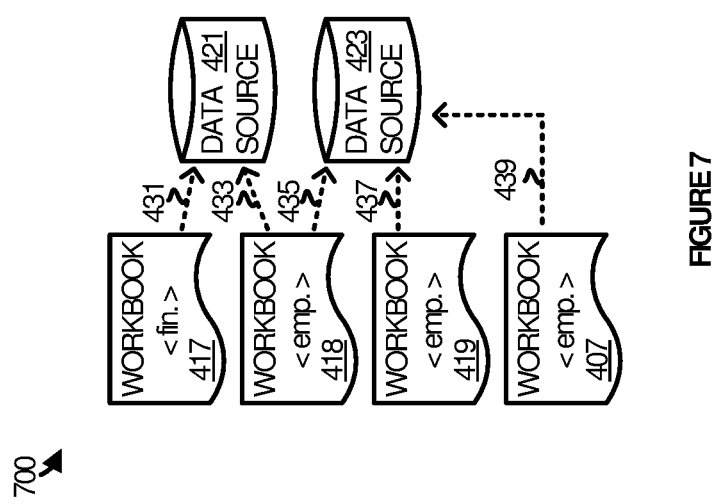

IDENTIFYING AND SURFACING RELEVANT REPORT ARTIFACTS IN DOCUMENTS

RELATED APPLICATIONS

This application is a continuation of U.S. patent application Ser. No. 14/335,864, entitled "IDENTIFYING AND SURFACING RELEVANT REPORT ARTIFACTS IN DOCUMENTS," and filed Jul. 18, 2014, which is hereby incorporated by reference in its entirety.

BACKGROUND

Productivity applications are utilized for a wide variety of tasks, including creating and working with reports in documents such as word processing documents, spreadsheets, and presentations. Examples of productivity applications include, but are not limited to, word processors, spreadsheet software, presentation applications, note taking applications, and collaboration software.

An increasing number of productivity applications are delivered as software services from what is colloquially referred to as the cloud. In these deployments, a local application may run on a user's device that provides a user interface to an application service hosted in a data center or some other computing environment. The documents that a user works with may be stored locally but may also be stored by the service or by an associated cloud-based storage service. Any number of computing devices may be leveraged to take advantage of such services, including, but not limited to, mobile devices, smart phones, laptops, tablets, desktop computers, and any other suitable platform.

Several significant barriers confront users when developing reports in productivity applications. Some productivity applications provide data connections that allow a document to connect to an external data source. Queries may also be defined that allow data sources to be queried from within a document. However, defining a given data connection or query can be a time consuming and painstaking task, especially for users that are not familiar with such tools.

The difficulty associated with creating data connections, queries, and other artifacts may discourage users from utilizing them. In the event a user does proceed with creating a document artifact, he or she may be duplicating the efforts of others. Users may mitigate some of the challenges encountered when creating data connections and queries by manually searching through other spreadsheets, presentations, and other documents that might contain useful connections and queries that a user could use as a template. Search tools exist for searching document repositories for relevant documents, but utilizing these tools falls outside of a user's normal work flow.

OVERVIEW

Provided herein are systems, methods, and software to enhance document productivity. Users may desire to add report artifacts to documents. In accordance with various implementations disclosed herein, other documents or report artifacts may be identified and surfaced as suggestions to the users. The suggestions may allow the users to develop report artifacts with greater ease and possibly discover other development ideas.

In at least one implementation, when an attempt is initiated via a user interface to add a data connection in a document, another document or documents may be identified that are relevant to the document. In addition, a suggestion may be surfaced in a user interface that identifies at least a portion of the one other documents. The suggestion may be selected for inclusion in the document, thereby easing the development of report artifacts.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 7 illustrates a portion of an operational architecture in an implementation of enhanced document productivity.

DETAILED DESCRIPTION

Figure 1:
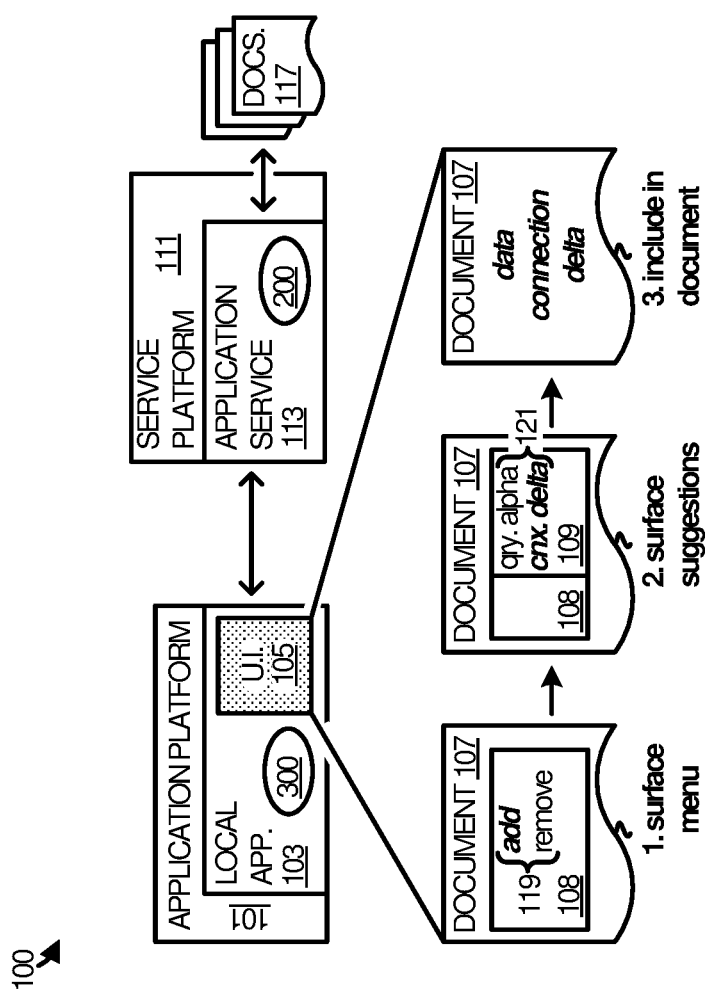
FIG. 1 illustrates an operational scenario in an implementation of enhanced document productivity.

Implementations disclosed herein enhance the user experience when adding report artifacts to documents. In some implementations, when a user attempts to add a data connection to a document, various report artifacts may be suggested to the user that are drawn from other documents having the same or similar data connection. Examples of the suggested artifacts include, but are not limited to, charts, pivot tables, conditional formatting, and other data connections and queries, as well as any other type of report artifact. In other implementations, various data connections may be suggested to a user when an attempt is made to add a data connection. The various data connections may be drawn from documents having the same or similar characteristics as the document to which the data connection is being added. Various combinations and iterations of these principles are possible and may be considered within the scope of the present disclosure.

In one exemplary scenario, other workbooks or reports may be suggested based on the structure or other characteristics of a user's workbook or existing data connections in the workbook as the user begins to add a data connection via a user interface. Based on the data connection or past data connections used, a service can suggest similar workbooks that utilize the same or related data connections. The user can open the suggested workbook to see if it meets their requirements and can be re-used or copied to act as a foundation for their own work, or simply to discover related insights.

In another exemplary scenario, a user may be able to view suggested data connections used in other reports based on the structure of the content and data of their report and the connections he or she is trying to add. For instance, a user may open a blank workbook and may begin to add a data connection via a user interface. Based on their previous connections and the content of their workbooks, a service may suggest a list of most recently used or similar data connections used in other reports. The user may add a data connection via a graphic or other element in the user interface used to indicate the suggested connection. The service may refine the suggestions based on the user's added connection and may provide additional related data connections or other workbooks that have utilized the same or related connections. The user can then add or manage connections or copy and add workbook elements based on those suggestions.

In an implementation, an application service identifies an artifact or artifacts that may be relevant to an attempt to add a data connection or query in a document. The relevant artifacts may be surfaced in a user interface that is rendered by a local application via which a user may interact with the document. The suggested artifacts may allow the user to more quickly produce reports, for example. In some cases the relevant artifacts may be other data connections or queries, while in other cases the suggested artifacts may include other charts, pivot tables, conditional formatting, or other aspects of one or more other documents that may be relevant to the data connection or query being added.

In at least one scenario, when a user may makes a connection to a data source (by explicitly typing in the data source name, searching for the data source, using an existing connection file, etc.), an application service and associated local application may provide an experience that allows the user to build a new connection, query, or other report artifact. In addition, the experience can include suggestions of popular or similar reports that also use the same or similar data source and fields. In many cases, multiple users may have built the same or similar reports, which can be leveraged when identifying and surfacing suggestions. Report content in those other reports may be surfaced to the user for inclusion in their own report. For instance, the user may leverage an existing data connection, query, chart, pivot table, or conditional formatting found in another report when developing their own report.

The other reports may be discovered based at least in part on the data connection the user is attempting to add to their own report. The data connection may refer to a data source to which other existing reports already connect. Those other reports, by virtue of their association with similar data connections, may be the reports from which report artifacts may be drawn and suggested to the user for inclusion in their own report.

Referring now to the drawings, FIG. 1 illustrates an operational scenario 100 in an implementation that demonstrates various aspects of enhanced document productivity. Operational scenario 100 involves at least application platform 101 and service platform 111. Local application 103 is executed within the context of application platform 101, while application service 113 is hosted by and runs within the context of service platform 111.

Local application 103 may be considered remote from application service 113 in that each are implemented on separate computing platforms. In such situations, local application 103 and application service 113 may communicate by way of data and information exchanged between application platform 101 and service platform 111 over a suitable communication link or links (not shown). However, it is possible that in some implementations the features and functionality provided by local application 103 and application service 113 could be co-located or even integrated as a single application.

In operation, local application 103 renders document 107 in user interface 105. Document 107 may include text, images, or any other content, although document 107 may also be empty, such as when a user creates a new document. Document 107 is representative of any document within which report artifacts may be created. Examples of document 107 include, but are not limited to, word processing documents, spreadsheet workbooks, and presentation documents, as well as any other suitable document.

A user engaged with document 107 via user interface 105 may initiate a process of adding a report artifact, such as a data connection or query, to document 107. Menu 108 is presented in user interface 105 from which the user may make various selections from a set of options 119. In this example, the set of options 119 includes the option to add a report artifact and the option to remove a report artifact. Other options are possible in addition to or in place of those disclosed herein and may be considered within the scope of the present disclosure.

It is assumed for exemplary purposes that the user selects the option to add a report artifact. In some scenarios, menu 109 is surfaced in response to the selection of the option to add a report artifact. Menu 109 includes various suggestions 121 for what artifacts to add that may be identified based on various characteristics of document 107, such as what information, fields, or other identifying features are included in document 107.

However, menu 109 may also be surfaced in response to some other intermediate step or steps that occur after the option to add an artifact is selected. For example, a user may enter at least the beginning of, or possibly the entirety of, a text string that represents a data connection. Under such circumstances, menu 109 may include various suggestions that are derived from or related to the data connection, such as relevant artifacts that may be found in other documents that share the same or a similar data connection.

Menu 109 may also be surfaced in an iterative manner, or at least more than once. For instance, menu 109 may be surfaced when the option to add a data connection is selected, in which case menu 109 would include suggested data connections. Upon a user selecting one of the suggested data connections, menu 109 could re-surface or be updated to include other suggested artifacts, such as charts, pivot tables, conditional formatting drawn from documents sharing the data connection in common with document 107.

For illustrative purposes only, the suggestions 121 in FIG. 1 include a suggested query (alpha) and a suggested data connection (delta). Other suggestions are possible in addition to or in place of those disclosed herein and may be considered within the scope of the present disclosure, such as suggested charts, pivot tables, conditional formatting, or other artifacts that may be deemed relevant to the attempt to add an artifact. The user may select any one or more of the suggestions 121 for inclusion in document 107. In this example, the data connection "delta" is selected.

Figure 2:
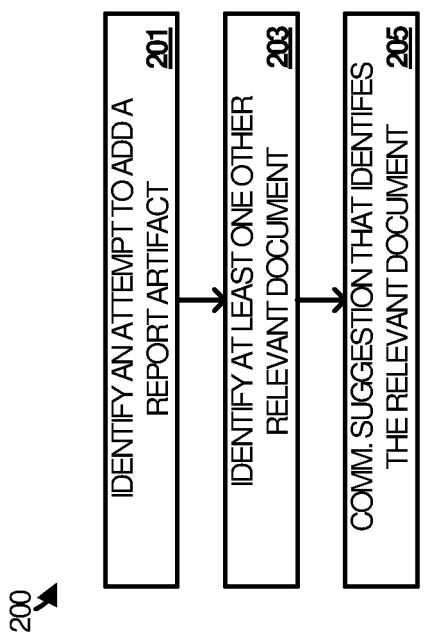
FIG. 2 illustrates an artifact process that may be employed by an application service in an implementation.

The suggestions surfaced in menu 109 are identified by application service 113 employing artifact process 200. Referring parenthetically to the steps illustrated in FIG. 2, application service 113 identifies an attempt to add a report artifact in a document (step 201). Identifying the attempt may include, for example, receiving a notification or other such information from local application indicative of the actions taken by the user via user interface 105 to add the report artifact. In some scenarios, the user may enter at least the beginning text of a string that describes a data connection, query, or the like, which may be provided to application service 113. In other examples, just the fact that a particular menu or option was selected may be communication to application service 113. Other mechanisms to alert application service 113 that a report artifact is being added are possible and may be considered within the scope of the present disclosure.

Application service 113 proceeds to identify at least one other document that may be relevant to the attempt to add the artifact (step 203). In the context of operational scenario 100, documents 117 are representative of a set of documents from which application service 113 may select a relevant document or portion thereof. The relevance of any of documents 117 may be determined based on the various characteristics of the report artifact being added and characteristics of the documents 117.

For example, the report artifact being added may reference a particular data source. Documents 117 may thus be examined for those that include report artifacts that reference the same data source. Other examples include the structure or content of the documents 117 themselves. The document to which the artifact is being added may have a certain structure or include certain content that can be compared to the structure and content of the document 117. Those of documents 117 having similar structure, content, or both may be selected as relevant to the attempt to add the report artifact. Yet other characteristics or considerations include the identity of the author or authors for any given one of documents 117, the group to which an author or document belongs, and the like.

Having identified at least one other document that may be relevant to the attempt, application service 113 communicates a suggestion that identifies at least a portion of the relevant document (step 205). The suggestion may identify a data connection, query, chart, pivot table, conditional formatting, or macro for surfacing as a suggestion in user interface 105. However, the entire document may also be identified as a suggestion such that the user may be prompted to open and explore the document as a whole. Other suggestions, including variations and combinations thereof, are possible and may be considered within the scope of the present disclosure.

Figure 3:
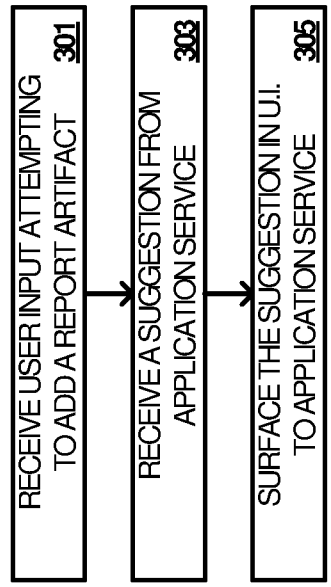
FIG. 3 illustrates an artifact process that may be employed by a local application in an implementation.

Complimenting artifact process 200, employed by application service 113, is artifact process 300 employed by local application 103. Referring parenthetically to the steps illustrated in FIG. 3, local application 103 receives user input that comprises an attempt to add a report artifact (step 302). Such user input may include, for example, a menu selection, the keying-in of a text string, or some other suitable user input.

Local application 103 communicates with application service 113 to provide notification of the attempt, in response to which application service 113 provides a suggestion or suggestions for local application 103 to surface in user interface 105. Local application 103 receives the suggestions (step 303) and responsively surfaces them in an appropriate manner via user interface 105 (step 305). The suggestions may be presented in a most-recently-used list, a results list, a favorites list, a suggestions window, or some other suitable framework for surfacing suggestions. The user engaged with user interface 105 may thus integrate any of the suggestions or otherwise take inspiration from any of the suggestions when developing report artifacts in his or her document.

Figure 9:
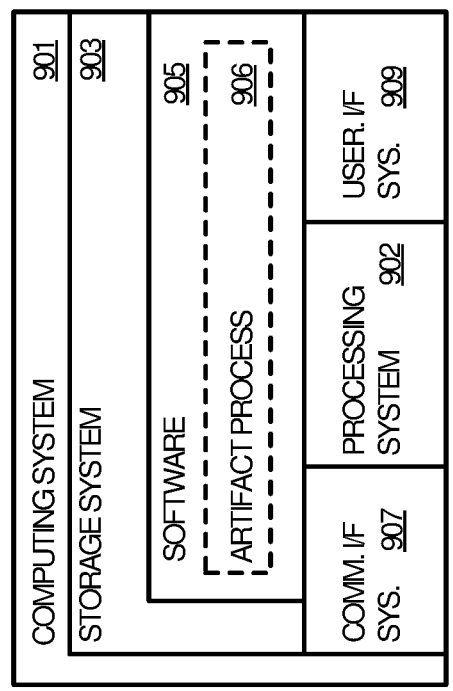
FIG. 9 illustrates a computing system suitable for implementing any of the applications, services, processes, architectures, user experiences, and operational scenarios disclosed herein with respect to FIGS. 1-8 and discussed below in the Technical Disclosure.

Referring back to FIG. 1, application platform 101 is representative of any physical or virtual computing system, device, or collection thereof capable of hosting local application 103 and employing artifact process 300. Examples include, but are not limited to, smart phones, laptop computers, tablet computers, desktop computers, hybrid computers, gaming machines, smart televisions, entertainment devices, Internet appliances, and virtual machines, as well as any variation or combination thereof, of which computing system 901 illustrated in FIG. 9 is representative.

Local application 103 is representative of any software application, module, component, or collection thereof, capable of implementing user interface 105. Examples include, but are not limited to, word processing applications, spreadsheet applications, presentation applications, web browsers, blogging and micro-blogging applications, social networking applications, and e-commerce applications, as well as any other type of suitable application. Local application 103 may be a browser-based application that executes in the context of a browser application. In some implementations, local application 103 may execute in the context of or in association with a web page, web site, web service, or the like. However, local application 103 may also be a locally installed and executed application, a streamed application, a mobile application, or any combination or variation thereof. Local application 103 may be implemented as a stand-alone application or may be distributed across multiple applications.

Service platform 111 is representative of any physical or virtual computing system, device, or collection thereof capable of hosting all or a portion of application service 113 and implementing all or portions of artifact process 200. Examples of service platform 111 include, but are not limited to, server computers, web servers, application servers, rack servers, blade servers, virtual machine servers, or tower servers, as well as any other type of computing system, of which computing system 901 illustrated in FIG. 9 is representative. In some scenarios, service platform 111 may be implemented in a data center, a virtual data center, or some other suitable facility.

Application service 113 is any software application, module, component, or collection thereof capable of employing artifact process 200 and providing an application service to local application 103. Examples of application service 113 include, but are not limited to, Office365® from Microsoft® and Google® Docs, as well as any other suitable application service, combination of services, or variations thereof.

Figure 4:
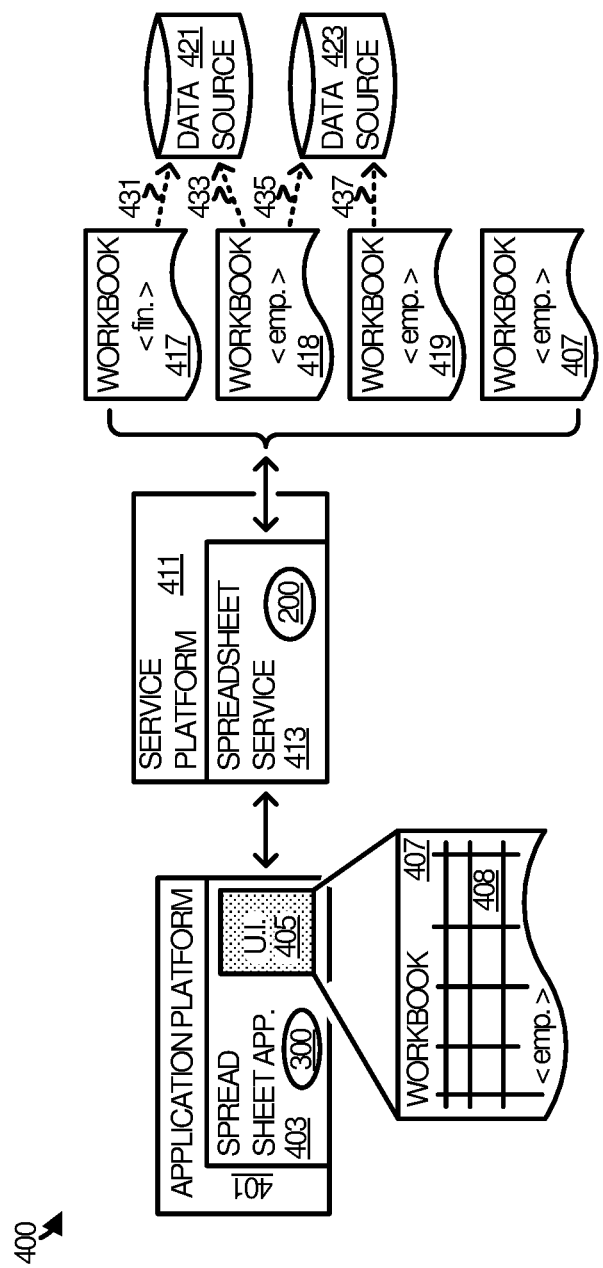
FIG. 4 illustrates an operational architecture in an implementation.

FIG. 4 illustrates operational architecture 400 in an implementation. Operational architecture 400 involves at least application platform 401, which hosts spreadsheet application 403, and service platform 411, which hosts spreadsheet service 413. A user may interact with a workbook hosted by spreadsheet service 413 by way of user interface 405 rendered by spreadsheet application 403 on application platform 401. Spreadsheet service 413 may host any number of workbooks, of which workbook 417, workbook 418, workbook 419, and workbook 407 are representative. In operational architecture 400, a user interacts with workbook 407 in particular via user interface 405. Workbook 407 is representative of a spreadsheet workbook and thus includes a grid 408 defined by rows and columns.

In this example scenario, workbook 407 has yet to be connected to an external data source. However, data connection 431 links workbook 417 to data source 421; data connection 433 links workbook 418 to data source 421; data connection 435 links workbook 418 to data source 423; and data connection 437 connects workbook 419 to data source 423. Data connections 431, 433, 435, and 437 allow data to be obtained from data sources 421 and 423 to be stored in, consumed by, or otherwise processed by workbooks 417, 418, and 419. Other data connections, queries, or report artifacts in addition to or in place of those disclosed herein are possible and may be considered within the scope of the present disclosure.

Data source 421 and data source 423 are each representative of a suitable data source from which data may be obtained by way of a data connection or other report artifact. Examples of such data sources include, but are not limited to, structured query language (SQL) data bases, SharePoint® lists, NoSQL data sources, object linking and embedding (OLE) data bases, open database connectivity (ODBC) sources, Oracle® data sources, Amazon® data sources, Google® data sources, and any other type of data source to which a data connection can be established.

Workbooks 417, 418, 419, and 407 may each be stored by spreadsheet service 413 such that they may be considered to reside in the service. However, each workbook may also be stored elsewhere, possibly by some other storage service that is accessible by spreadsheet service 413. Spreadsheet service 413 itself may be a stand-alone service or may be integrated with other services as part of a larger productivity service. Examples of such services include, but are not limited to, Google® Sheets, Excel® Online, Excel® Services, and Excel® Web App, as well as any other combination or variation thereof. Examples of a larger service include, but are not limited to, Microsoft® Office®, Office365®, and Google® Docs. Other types of spreadsheet service and productivity services are possible in addition to or in place of those disclosed herein.

Figure 6:
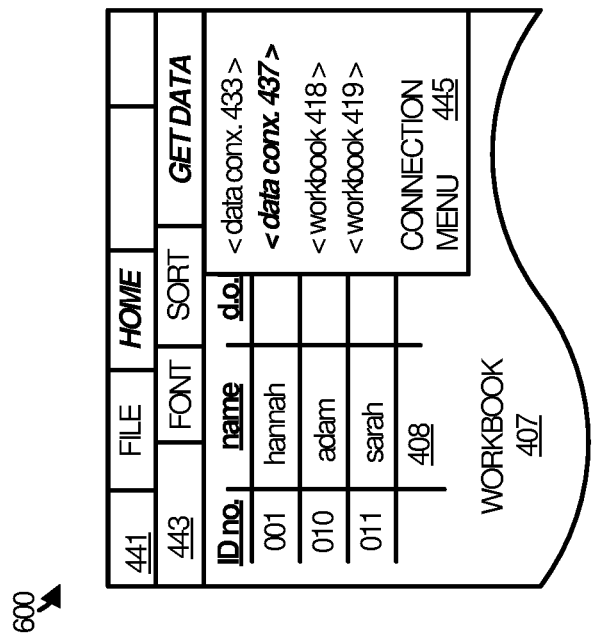
FIG. 6 illustrates a stage of a user experience in an implementation of enhanced document productivity.
Figure 5:
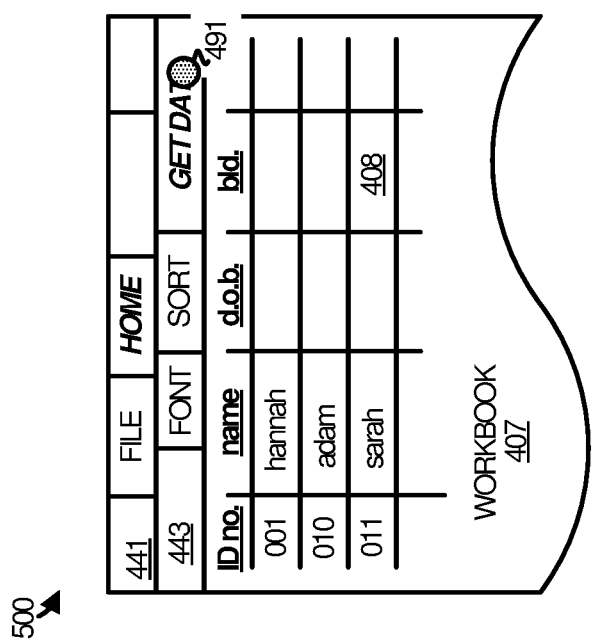
FIG. 5 illustrates a stage of a user experience in an implementation of enhanced document productivity.

A user engaged with workbook 407 may desire to add a data connection. In support of such functionality, spreadsheet service 413 employs artifact process 200, or some other similar service, while spreadsheet application employs artifact process 300. FIG. 5 and FIG. 6 illustrate in detail various stages in the user experience as the user proceeds with adding the data connection. The following discussion of operational architecture 400 therefore references stage 500 and stage 600 in the user experience.

In stage 500 of the user experience, workbook 407 is presented to the user by way of user interface 405. Workbook 407 includes cells in grid 408 which are defined by rows and columns. Example data is included in some of the cells, although other data is possible, or even no data in the case of a new spreadsheet.

Workbook 407 also includes various features and functionality accessible by way of various menus, graphics, or other such controls, of which menu 441 and menu 443 is representative. Menu 441 is representative of a main or base menu and includes two options: a file option and a home option. Other options or features are possible in addition to or in place of those disclosed herein and may be considered within the scope of the disclosure.

In stage 500, it is assumed for exemplary purposes that the home option had been selected by the user, thus surfacing menu 443. This selection is indicated in the drawings by the bold and italicized font that distinguishes the home option.

Menu 443 includes various sub-options, including a font option, a sort option, and a get data option. Other options or features are possible in addition to or in place of those disclosed herein and may be considered within the scope of the disclosure.

In operation, a user may make a selection 491 of the get data option so as to launch a data connection process. Launching the data connection process causes spreadsheet application 403 to communicate with spreadsheet service 413 to obtain suggestions for surfacing in menu 445, which is illustrated in the context of stage 600.

Stage 600 is representative of a stage in the user experience that may be encountered once a user has initiated an attempt to add a data connection. In this example, stage 600 follows the selection 491 of the get data option in menu 443. Selection 491 may thus be considered an attempt, or the beginning of an attempt, to add a data connection. However, other interactions may also be considered an attempt to add a data connection. Those other interactions may also lead to stage 600 and the surfacing of suggestions in connection menu 445. For instance, a user may enter a string that at least partly describes a data source or data connection. The string may be entered in a search box, for example. Entering the string may itself be considered an attempt to add a data connection which triggers the surfacing of data connection suggestions.

Regardless of the path taken to reach stage 600, various documents, partial documents (charts, graphs, reports, etc.), data connections, queries, or other useful information may be surfaced in connection menu 445 to assist the user with building a data connection or connections or other report content. In this example, spreadsheet service 413, employing artifact process 300, has determined to suggest data connection 433, data connection 437, workbook 418, and workbook 419 for consideration by the user. Spreadsheet service 413 may consider a variety of factors when selecting which data connections or other elements to suggest. For example, workbook 407 may include employee information, as illustrated by the symbol "<emp.>." Comparing this characteristics of workbook 407, spreadsheet service 413 may conclude that workbook 418 and workbook 419 are more relevant than workbook 417. As such, the various data connections and other artifacts in workbook 418 and workbook 419 may qualify for further consideration by spreadsheet service 413.

Indeed, not all of the data connections associated with a given document that is deemed to be relevant need be included in the suggestions. Rather, it is possible that just a subset of the data connections in a relevant document would be considered relevant to an attempt to add a data connection. To that point, while data connection 433 in workbook 418 is determined to be relevant, data connection 435 in workbook 418 is not. This may be the case because, for example, data connection 435 may be duplicative in view of data connection 437 or for some other reason.

As data connection 433, data connection 437, workbook 418, and workbook 419 are surfaced in connection menu 445, the user may choose to explore any of them in more detail. The user may, for example, open workbook 418 or workbook 419 in order to explore their contents. Either of the surfaced data connections may also be selected for a more detailed examination by the user. The user may then elect to include any of the data connections or even content from the workbooks in workbook 407. It is assumed for exemplary purposes that data connection 437 is selected for inclusion in workbook 407. Including data connection 437 in workbook 407 may be accomplished in a variety of ways, such as by a drag-and-drop operation, a copy and paste operation, or simply by re-typing the string that describes data connection 437.

FIG. 7 illustrates a portion 700 of operational architecture 400 that represents a state that may be achieved following stage 500 and 600. Following stage 500 and stage 600, stage 700 illustrates the data connections between workbooks 417, 418, 419 and 407 that may result. In particular, data connection 439 now connects workbook 407 to data source 423. Data source 423 may thus be queried by workbook 407, portions of workbook 407 can be populated with information from data source 423, and other related operations may occur over data connection 439. Report data may be read-in from data source 423. Other types report content may also be imported from data source 423, including charts, pivot tables, conditional formatting, and the like.

Figure 8:
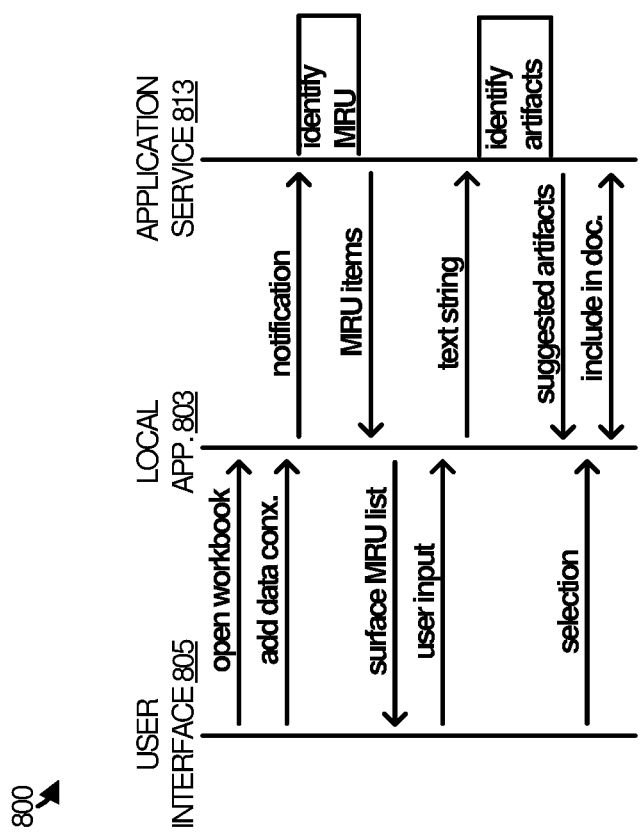
FIG. 8 illustrates an operational sequence in an implementation.

FIG. 8 illustrates an exemplary operational sequence 800 that may occur in the context of implementing enhanced document productivity as discussed herein. In operation, a user provides user input via user interface 805 that directs a workbook or other such document to be opened by local application 803, application service 813, or both. The document is opened and various menus and features are surfaced to the user.

The user further attempts by way of user input to user interface 805 to add a data connection, query, or other report artifact to the document. Local application 803 communicates a notification of the event to application service 813. Application service 813, in turn, identifies a most-recently-used list of report artifacts. The most-recently-used list may identify previous data connections constructed by the user, previous, queries, or other report artifacts recently used by the same user. The most-recently-used list may also surface other documents accessed recently by the user. Other items may be surfaced in addition to or in place of those disclosed and may be considered within the scope of the disclosure, such as reports most recently or frequently used by personnel in an organization.

Application service 813 communicates the most-recently-used list to local application 803, which then surfaces the most-recently-used list in user interface 805. The user may consider the most-recently-used list and utilize some or all if the information contained therein. The user may also enter a search string, the beginning of string that defines a data connection, or some other information that application service 813 can examine when searching for relevant report artifacts.

Application service 813 identifies relevant artifacts and provides suggestions indicative of the artifacts to local application 803. Local application 803 surfaces the artifacts in user interface 805, from which the user may select one or more of the artifacts for inclusion in the document. At least a selected one the artifacts may be identified through user interface 805 and stored, written to, or otherwise included in the document.

Referring back to FIG. 4, application platform 401 is representative of any physical or virtual computing system, device, or collection thereof capable of hosting spreadsheet application 403 and employing artifact process 300. Examples include, but are not limited to, smart phones, laptop computers, tablet computers, desktop computers, hybrid computers, gaming machines, smart televisions, entertainment devices, Internet appliances, and virtual machines, as well as any variation or combination thereof, of which computing system 901 illustrated in FIG. 9 is representative.

Spreadsheet application 403 is representative of any software application, module, component, or collection thereof, capable of implementing user interface 405. Spreadsheet application 403 may be a browser-based application that executes in the context of a browser application. In some implementations, spreadsheet application 403 may execute in the context of or in association with a web page, web site, web service, or the like. However, spreadsheet application 403 may also be a locally installed and executed application, a streamed application, a mobile application, or any combination or variation thereof. Spreadsheet application 403 may be implemented as a stand-alone application or may be distributed across multiple applications.

Service platform 411 is representative of any physical or virtual computing system, device, or collection thereof capable of hosting all or a portion of spreadsheet service 413 and implementing all or portions of artifact process 200. Examples of service platform 411 include, but are not limited to, server computers, web servers, application servers, rack servers, blade servers, virtual machine servers, or tower servers, as well as any other type of computing system, of which computing system 901 illustrated in FIG. 9 is representative. In some scenarios, service platform 411 may be implemented in a data center, a virtual data center, or some other suitable facility. Spreadsheet service 413 is any software application, module, component, or collection thereof capable of employing artifact process 200 and providing an application service to spreadsheet application 403.

Various technical effects may be appreciated from the disclosure above. In at least one implementation, a user is able to consume suggested data connections or similar reports and workbook structures based on information that may be known about other similar reports and workbooks. Data connections and data representations (charts, pivot tables, graphs, etc.) are sometimes difficult create and modify. By suggesting workbooks and connections that have already been created, much of the guesswork and irritation can be removed. Through the use of visuals, further context can be provided about the connection or workbook which will allow users to make a more informed decision and expedite their path to productivity.

FIG. 9 illustrates computing system 901 that is representative of any system or collection of systems in which the various operational architectures, scenarios, and processes disclosed herein may be implemented. Examples of computing system 901 include, but are not limited to, smart phones, laptop computers, tablet computers, desktop computers, hybrid computers, gaming machines, virtual machines, smart televisions, smart watches and other wearable devices, as well as any variation or combination thereof. Other examples include server computers, rack servers, web servers, cloud computing platforms, and data center equipment, as well as any other type of physical or virtual server machine, and any variation or combination thereof.

Computing system 901 may be implemented as a single apparatus, system, or device or may be implemented in a distributed manner as multiple apparatuses, systems, or devices. Computing system 901 includes, but is not limited to, processing system 902, storage system 903, software 905, communication interface system 907, and user interface system 909. Processing system 902 is operatively coupled with storage system 903, communication interface system 907, and user interface system 909.

Processing system 902 loads and executes software 905 from storage system 903. Software 905 includes at least artifact process 906, which is representative of artifact process 200 and artifact process 300 discussed with respect to the foregoing implementations. When executed by processing system 902 to enhance document productivity, software 905 directs processing system 902 to operate as described herein for at least the various processes, operational scenarios, and sequences discussed in the foregoing implementations. Computing system 901 may optionally include additional devices, features, or functionality not discussed for purposes of brevity.

Referring still to FIG. 9, processing system 902 may comprise a micro-processor and other circuitry that retrieves and executes software 905 from storage system 903. Processing system 902 may be implemented within a single processing device, but may also be distributed across multiple processing devices or sub-systems that cooperate in executing program instructions. Examples of processing system 902 include general purpose central processing units, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which at least some of software 905 may be communicated internally or externally. Storage system 903 may be implemented as a single storage device, but may also be implemented across multiple storage devices or sub-systems co-located or distributed relative to each other. Storage system 903 may comprise additional elements, such as a controller, capable of communicating with processing system 902 or possibly other systems.

Software 905 may be implemented in program instructions and among other functions may, when executed by processing system 902, direct processing system 902 to operate as described with respect to the various operational scenarios, sequences, and processes illustrated herein. For example, software 905 may include program instructions for implementing artifact process 200, artifact process 300, user interface 105, or user interface 405, and their respective functionality.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software or other application software, in addition to or that include artifact process 906. Software 905 may also comprise firmware or some other form of machine-readable processing instructions executable by processing system 902.

In general, software 905 may, when loaded into processing system 902 and executed, transform a suitable apparatus, system, or device (of which computing system 901 is representative) overall from a general-purpose computing system into a special-purpose computing system customized to facilitate enhanced document productivity. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Referring again to FIG. 1 as an example, through the operation of a computing system or systems of which computing system 901 is representative, transformations may be performed with respect to document 107. In a first stage, document 107 does not include a report artifact. Via the operation of local application 103 and application service 113, artifact suggestions selections are surfaced and a given artifact may be selected by a user for inclusion in document 107, thereby changing it to a different state.

It may be understood that computing system 901 is generally intended to represent a computing system or systems on which software 905 may be deployed and executed in order to implement enhanced document productivity. However, computing system 901 may also be suitable as any computing system on which software 905 may be staged and from where one or both may be distributed, transported, downloaded, or otherwise provided to yet another computing system for deployment and execution, or yet additional distribution.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 909 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 909. In some cases, the input and output devices may be combined in a single device, such as a display capable of displaying images and receiving touch gestures. The aforementioned user input and output devices are well known in the art and need not be discussed at length here.

User interface system 909 may also include associated user interface software executable by processing system 902 in support of the various user input and output devices discussed above. Separately or in conjunction with each other and other hardware and software elements, the user interface software and user interface devices may support a graphical user interface, a natural user interface, or any other type of user interface. For example, user interface 105 and user interface 405 may be presented through user interface system 909. Likewise, the various stages 500 and 600 discussed with respect to workbook 407 may be presented through user interface system 909. In addition, user input made with respect to user interface 105 and user interface 405 or discussed with respect to the user experience may be input via user interface system 909.

Communication between computing system 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

While FIGS. 1-9 generally depict relatively few operational scenarios and sequences, it may be appreciated that the concepts disclosed herein may be applied at scale and routinely. For example, the application service disclosed herein could be deployed in support of any number of local applications and any number of documents.

Certain inventive aspects may be appreciated from the foregoing disclosure, of which the following are various examples.

Example 1: A method of operating an application service to enhance document productivity, the method comprising: identifying an attempt to add a data connection in a document; in response to identifying the attempt to add the data connection in the document, identifying at least one other document as relevant to the attempt; and communicating a suggestion that identifies at least a portion of the one other document for surfacing in a user interface to the application service.

Example 2: The method according to Example 1, further comprising identifying contextual information associated with at least the portion of the one other document and communicating the contextual information for surfacing in the user interface to the application service in visual association with the suggestion.

Example 3: The method according to Examples 1 or 2 wherein the document comprises a spreadsheet workbook and wherein the data connection connects the spreadsheet workbook to an external data source and comprises a set of information for to accessing the external data source.

Example 4: The method according to any of the Examples 1-3 wherein identifying the attempt to add the data connection in the document comprises receiving a notification from a local application of the attempt to add the data connection in the document.

Example 5: The method according to any of the Examples 1-4 further comprising identifying an attempt to add a query in the document, responsively identifying at least one other query as relevant, and communicate another suggestion that identifies at least the one other query for surfacing in the user interface to the application service.

Example 6: The method according to any of the Examples 1-5 wherein at least the portion of the one other document comprises at least one of another data connection and a report in the one other document.

Example 7: The method according to any of the Examples 1-6 wherein identifying the attempt to add the data connection in the document comprises receiving text entered via the user interface to the application service and examining the text for attempts to add data connections in the document.

Example 8: The method according to any of the Examples 1-7 wherein the user interface comprises a data connections menu and wherein the text comprises a string entered via the data connections menu that describes at least a portion of the data connection.

Example 9: An apparatus comprising one or more computer readable storage media; and program instructions stored on the one or more computer readable storage media for enhancing document productivity that, when executed by a processing system, direct the processing system to at least: identify an attempt to add a report artifact to a spreadsheet workbook; in response to the attempt to add the report artifact to the spreadsheet workbook, identify at least one other report artifact as relevant to the attempt; and initiate a suggestion that identifies at least the other report artifact for surfacing in a user interface to the spreadsheet workbook.

Example 10: The apparatus of Example 9 further comprising the processing system configured to execute the program instructions, wherein the program instructions further direct the processing system to identify contextual information associated with at least the other report artifact and communicate the contextual information for surfacing in the spreadsheet workbook in visual association with the suggestion.

Example 11: The apparatus of Examples 9-10 wherein the report artifact comprises a data connection that connects the spreadsheet workbook to an external data source and comprises a set of information for accessing the external data source.

Example 12: The apparatus of Examples 9-11 wherein the program instructions further direct the processing system to identify an attempt to add a query in the spreadsheet workbook, responsively identify at least one other query as relevant, and initiate another suggestion that identifies at least the one other query for surfacing in the user interface.

Example 13: The apparatus of Examples 9-12 wherein, to identify the attempt to add the report artifact to the spreadsheet workbook, the program instructions direct the processing system to examine a notification of the attempt received from a local application that renders the user interface.

Example 14: The apparatus of Examples 9-13 wherein, to identify the attempt to add the report artifact to the spreadsheet workbook, the program instructions direct the processing system to examine text entered via the user interface for attempts to add report artifacts to the spreadsheet workbook.

Example 15: The apparatus of Examples 9-14 wherein report artifact comprises a data connection, the user interface comprises a data connection menu, and the text comprises a string entered via the data connection that describes at least a portion of the data connection.

Example 16: One or more computer readable storage media having program instructions stored thereon for facilitating enhanced document productivity that, when executed by a processing system, direct the processing system to at least: receive user input via a user interface to an application service, the user input comprising an attempt to add a data connection to a document rendered in the user interface; receive a suggestion from the application service that identifies at least a portion of one other document as relevant to the attempt to add the data connection; and surface in the suggestion in the user interface to the application service.

Example 17: The one or more computer readable storage media of Example 16 wherein the program instructions further direct the processing system to surface contextual information associated with at least the portion of the one other document in visual association with the suggestion.

Example 18: The one or more computer readable storage media of Examples 16-17 wherein the document comprises a spreadsheet workbook and wherein the data connection connects the spreadsheet workbook to an external data source and comprises a set of information for to accessing the external data source.

Example 19: The one or more computer readable storage media of Examples 16-18 wherein the user interface comprises a data connections menu and wherein the attempt to add the data connection comprises text entered via the data connections menu.

Example 20: The one or more computer readable storage media of Examples 16-19 wherein the text comprises a string entered via the data connections menu that describes at least a portion of the data connection and wherein the program instructions further direct the processing system to communicate a notification to the application service that identifies the string.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. A method of operating an application service, the method comprising:
in response to identifying by a processor an attempt in a user interface to add a data connection into a spreadsheet workbook, processing by the processor at least characteristics of the spreadsheet workbook to determine a suggestion comprising at least a portion of another document as relevant to the attempt; and
communicating by the processor the suggestion that identifies at least the portion of the other document for surfacing in the user interface to the application service.

2. The method of claim 1 further comprising identifying contextual information associated with at least the portion of the other document and communicating the contextual information for surfacing in the user interface to the application service in visual association with the suggestion.

3. The method of claim 2 wherein the data connection connects the spreadsheet workbook to an external data source and comprises a set of information for to accessing the external data source.

4. The method of claim 1 wherein identifying the attempt to add the data connection in the spreadsheet workbook comprises receiving a notification from a local application of the attempt to add the data connection in the spreadsheet workbook.

5. The method of claim 1 further comprising identifying an attempt to add a query in the spreadsheet workbook, responsively identifying at least one other query as relevant, and communicate another suggestion that identifies at least the one other query for surfacing in the user interface to the application service.

6. The method of claim 1 wherein at least the portion of the other document comprises at least one of another data connection and a report in the other document.

7. The method of claim 1 wherein identifying the attempt to add the data connection in the spreadsheet workbook comprises receiving text entered via the user interface to the application service and examining the text for attempts to add data connections in the spreadsheet workbook.

8. The method of claim 7 wherein the user interface comprises a data connections menu and wherein the text comprises a string entered via the data connections menu that describes at least a portion of the data connection.

9. An apparatus comprising:
one or more computer readable storage media; and
program instructions stored on the one or more computer readable storage media that, when executed by a processing system, direct the processing system to:
in response to an attempt to add a report artifact having a data connection to a data source into a document, process characteristics of the document to identify at least one other report artifact as relevant to the attempt; and initiate a suggestion that identifies at least the other report artifact for surfacing in a user interface to the document.

10. The apparatus of claim 9 further comprising the processing system configured to execute the program instructions, wherein the program instructions further direct the processing system to identify contextual information associated with at least the other report artifact and communicate the contextual information for surfacing in the document in visual association with the suggestion.

11. The apparatus of claim 10 wherein the report artifact comprises a data connection that connects the document to an external data source and comprises a set of information for accessing the external data source.

12. The apparatus of claim 11 wherein the program instructions further direct the processing system to identify an attempt to add a query in the document, responsively identify at least one other query as relevant, and initiate another suggestion that identifies at least the one other query for surfacing in the user interface.

13. The apparatus of claim 9 wherein, to identify the attempt to add the report artifact to the document, the program instructions direct the processing system to examine a notification of the attempt received from a local application that renders the user interface.

14. The apparatus of claim 9 wherein, to identify the attempt to add the report artifact to the document, the program instructions direct the processing system to examine text entered via the user interface for attempts to add report artifacts to the document.

15. The apparatus of claim 14 wherein report artifact comprises a data connection, the user interface comprises a data connection menu, and the text comprises a string entered via the data connection that describes at least a portion of the data connection.

16. One or more computer readable storage media having program instructions stored thereon that, when executed by a processing system, direct the processing system to:

receive user input via a user interface to an application service, the user input comprising an attempt to add a data connection to a spreadsheet workbook rendered in the user interface;

receive a suggestion from the application service that identifies at least a portion of one other document as relevant to the attempt to add the data connection; and surface the suggestion in the user interface to the application service.

17. The one or more computer readable storage media of claim 16 wherein the program instructions further direct the processing system to surface contextual information associated with at least the portion of the other document in visual association with the suggestion.

18. The one or more computer readable storage media of claim 17 wherein the spreadsheet workbook comprises a spreadsheet workbook and wherein the data connection connects the spreadsheet workbook to an external data source and comprises a set of information for to accessing the external data source.

19. The one or more computer readable storage media of claim 17 wherein the user interface comprises a data connections menu and wherein the attempt to add the data connection comprises text entered via the data connections menu.

20. The one or more computer readable storage media of claim 19 wherein the text comprises a string entered via the data connections menu that describes at least a portion of the data connection and wherein the program instructions further direct the processing system to communicate a notification to the application service that identifies the string.

* * * * *